United States Patent [19]
Cuomo et al.

[11] Patent Number: 6,148,328
[45] Date of Patent: Nov. 14, 2000

[54] METHOD AND SYSTEM FOR SIGNALING PRESENCE OF USERS IN A NETWORKED ENVIRONMENT

[75] Inventors: Gennaro Cuomo, Apex; Sandeep Kishan Singhal, Raleigh, both of N.C.

[73] Assignee: International Business Machines Corp., Armonk, N.Y.

[21] Appl. No.: 09/016,052

[22] Filed: Jan. 29, 1998

[51] Int. Cl.[7] .................................................. G06F 13/00
[52] U.S. Cl. ........................... 709/204; 370/260; 345/330
[58] Field of Search ............................. 709/204; 370/260, 370/261, 262; 345/330, 333; 348/15

[56] References Cited

U.S. PATENT DOCUMENTS

| | | | |
|---|---|---|---|
| 5,497,186 | 3/1996 | Kawasaki | 348/6 |
| 5,793,365 | 8/1998 | Tang et al. | 345/329 |
| 5,828,839 | 10/1998 | Moncrieff | 709/204 |
| 5,880,731 | 3/1999 | Liles et al. | 345/349 |
| 5,958,014 | 9/1999 | Cave | 709/229 |
| 5,990,887 | 11/1999 | Redpath et al. | 345/330 |

*Primary Examiner*—Kenneth R. Coulter
*Attorney, Agent, or Firm*—A. Bruce Clay

[57] ABSTRACT

Dynamic information is unobtrusively provided to a target user about other users in an online environment. The target user is informed of the arrival and departure from the environment of particular selected users. Additionally, an indication of an aggregate number of users in the environment is given to the target user.

33 Claims, 6 Drawing Sheets

METHOD AND SYSTEM FOR SIGNALING PRESENCE OF USERS IN A NETWORKED ENVIRONMENT

FIELD OF THE INVENTION

This invention relates in general to computer software, and in particular to a method and system for signaling to a target user the presence of other users in a networked environment. More particularly, the present invention relates to a method and system by which a target user can become aware of the arrival, departure, and continued presence of other users at their respective hosts.

BACKGROUND OF THE INVENTION

Software systems are emerging that enable users to connect to a server and learn about other users currently connected to the system. By learning about which users are presently "online," users can initiate direct communication such as text or audio chat, collaboration such as shared whiteboards or concurrent document editing, and video conferencing. These types of synchronous interactions contrast with traditional interactions such as electronic mail systems, which are inherently asynchronous and do not allow users to exchange data in real-time.

One type of on-line system allows the user to construct a list of other particular users that are of special interest. The software presents a textual list of which of these users are currently connected. These systems may be configured to play a sound whenever one of these "buddies" first becomes connected or becomes disconnected.

A goal of these systems is to provide the user with the experience of being part of an online community of sorts, much like an office building represents a real-world workplace. Within a real-world office, people are acutely aware of approximately how many people are currently in the office. They hear the arrival and departure of their co-workers, and they can quickly glance out of the office to see whether particular co-workers are present.

However, existing software systems do not effectively imitate the environment of an office community for several reasons. First, they require users to inspect the text list whenever they need to determine whether a particular user is currently on-line. Inspecting this list distracts the user from other tasks. Second, the arrival and departure of individual users is not distinguishable because the audio signals are all alike. Finally, the user is only aware of the selected user set. The software provides no indication of how many people, in the aggregate, are currently online.

Therefore, a need exists for a method and system for unobtrusively providing dynamic information about user presence in online environments. This presence information needs to not only include the arrival and departure of particular users but also must reflect the continued presence of those users and an indication of how many users in the aggregate are currently online.

SUMMARY OF THE INVENTION

An object of the present invention is to provide a method for signaling the arrival and departure of particular users in an online system.

Another object of the present invention is to signal the continued presence of particular users in an online system.

Yet another object of the present invention is to signal how many total users are currently present in an online system.

Still yet another object of the present invention is to enable individual users to intuitively customize each of the aforementioned signals.

To achieve the foregoing objects and in accordance with the purpose of the invention as broadly described herein, a method and system are disclosed for providing audio cues describing user presence in an online system. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
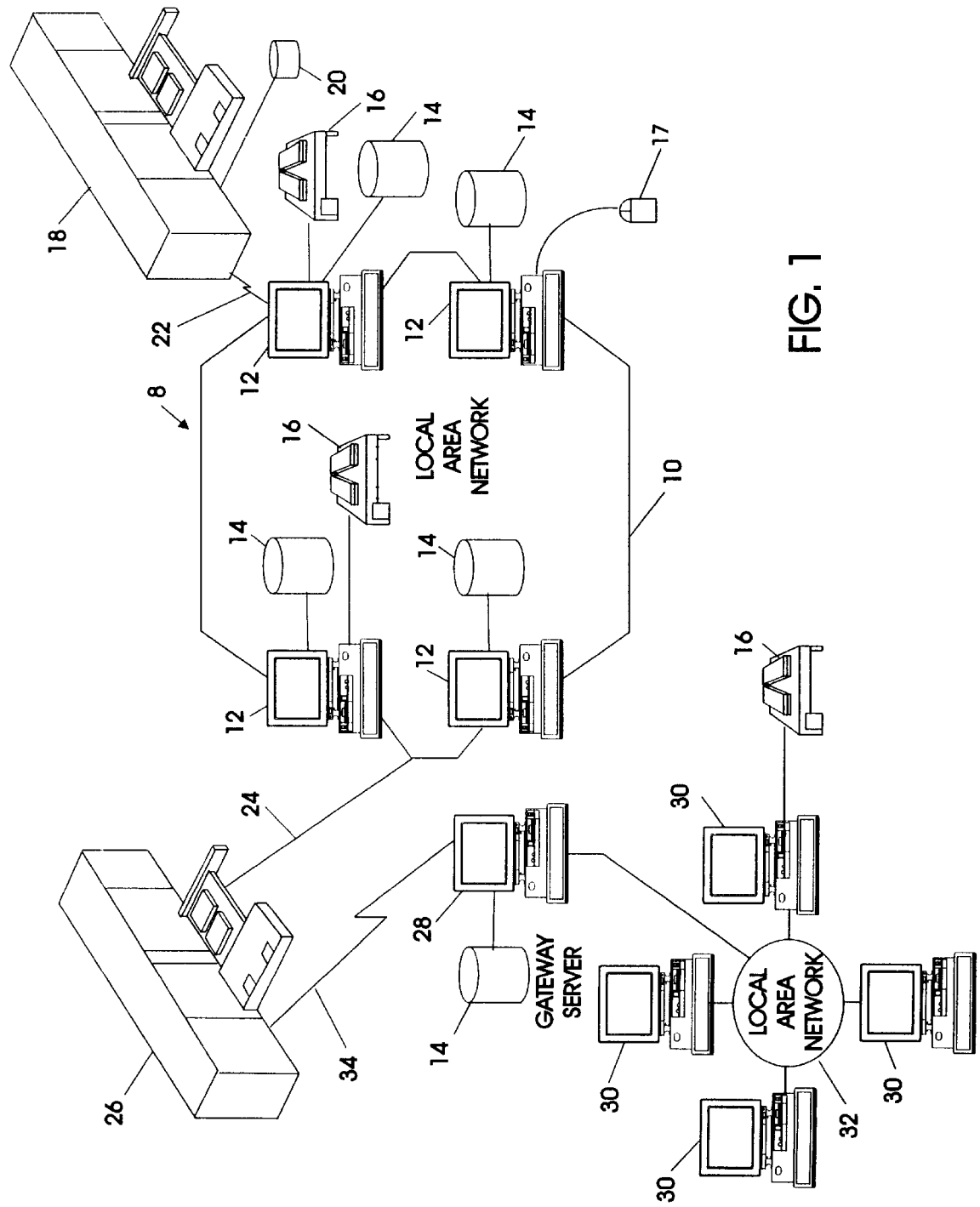
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
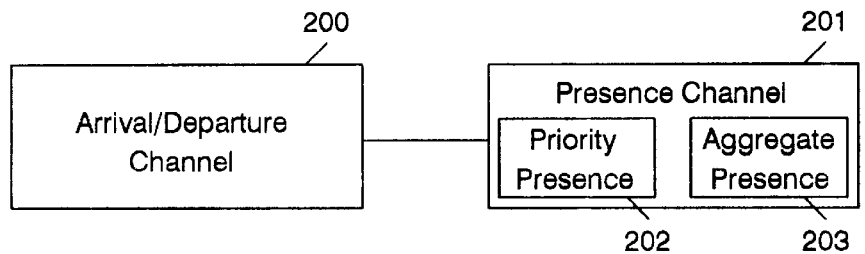
FIG. 2 depicts audio channels used to provide an online awareness system in accordance with the present invention.

Referring now to FIG. 2, three audio channels provided by an online awareness system in accordance with the present invention are illustrated. An Arrival/Departure Channel 200 signals the arrival and departure of a selected set of users while a Presence Channel 201 signals the continued presence of online users. The Presence Channel 201 is divided into two sub-channels, a Priority Presence sub-channel 202 and an Aggregate Presence sub-channel 203. The Priority Presence sub-channel 202 signals the continued presence of the selected set of users, and the Aggregate Presence sub-channel 203 signals the aggregate presence (ie., a total number) of all users who are currently online.

Figure 3:
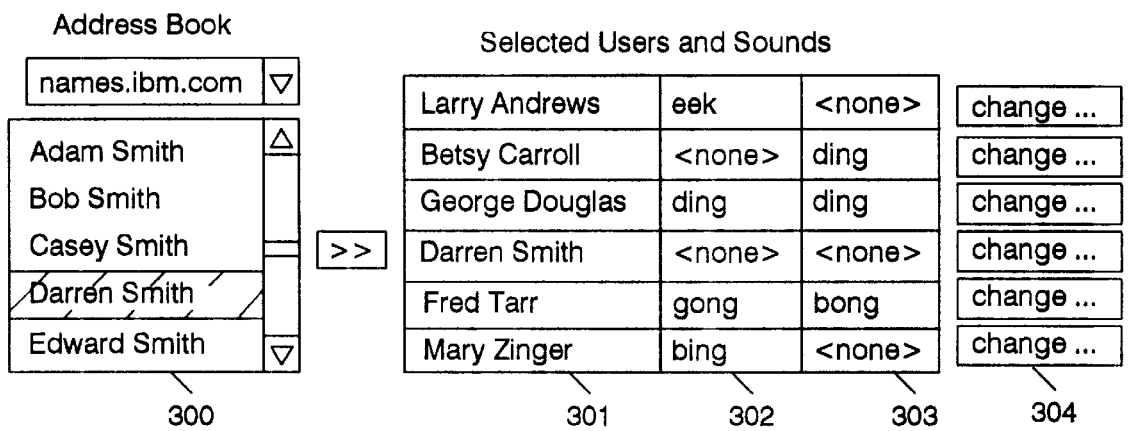
FIG. 3 illustrates a user interface that allows customization of an Arrival/Departure channel of an online awareness system in accordance with the present invention.

In FIG. 3, a sample user interface control for customizing the Arrival/Departure channel 200 of FIG. 2 is shown. In component 300, a user (target user) may select other users of interest by accessing a name and address directory server. In alternative embodiments of this component, the user may designate other users of interest by typing a name or electronic mail address. Component 301 provides a list of other users that have been selected by the target user for signaling. Component 302 allows the target user to designate an audio signal that should be played when one or more of the other users enters the online environment. Component 303 allows the target user to designate an audio signal that should be played when one or more of the other users departs the online environment. For example, user Fred Tarr has been associated with a "gong" sound when he becomes online and a "bong" sound when he disconnects. Another user, Mary Zinger, has been associated with a "bing" sound when she becomes online but no sound when she disconnects. A control 304 may also be provided in order to change the previous settings. Although this user interface control has been described with respect to a particular graphical embodiment, many interfaces can provide equivalent function and may be used by alternative embodiments of this invention. For example, components 302 and 303 may be represented as a single control.

Whenever another user selected by the target user comes online, the system must generate a corresponding online sound. For example, given the selections shown in FIG. 3, the arrival of Fred Tarr should signal a gong sound. Similarly, the departure of another selected user must cause the corresponding off-line sound to be generated. For example, the departure of Betsy Carroll should signal a ding sound.

The Arrival/Departure Channel must also respond to changes in the user selections in FIG. 3. For example, suppose that another user, Henry James, is currently online. If the target user subsequently adds Henry James to the selected user list (301 of FIG. 3) and associates an online sound (302 of FIG. 3) therewith, then that sound should be played immediately to signal Henry James' presence in the network environment. A similar situation arises when another user who is currently online is removed from the selected user list (301 of FIG. 3). For example, if Betsy Carroll is currently online but is removed from the selected user list, then the ding sound is played immediately to signal that her online presence is no longer visible. In this way, the arrival and departure of all selected users is signaled.

Figure 4:
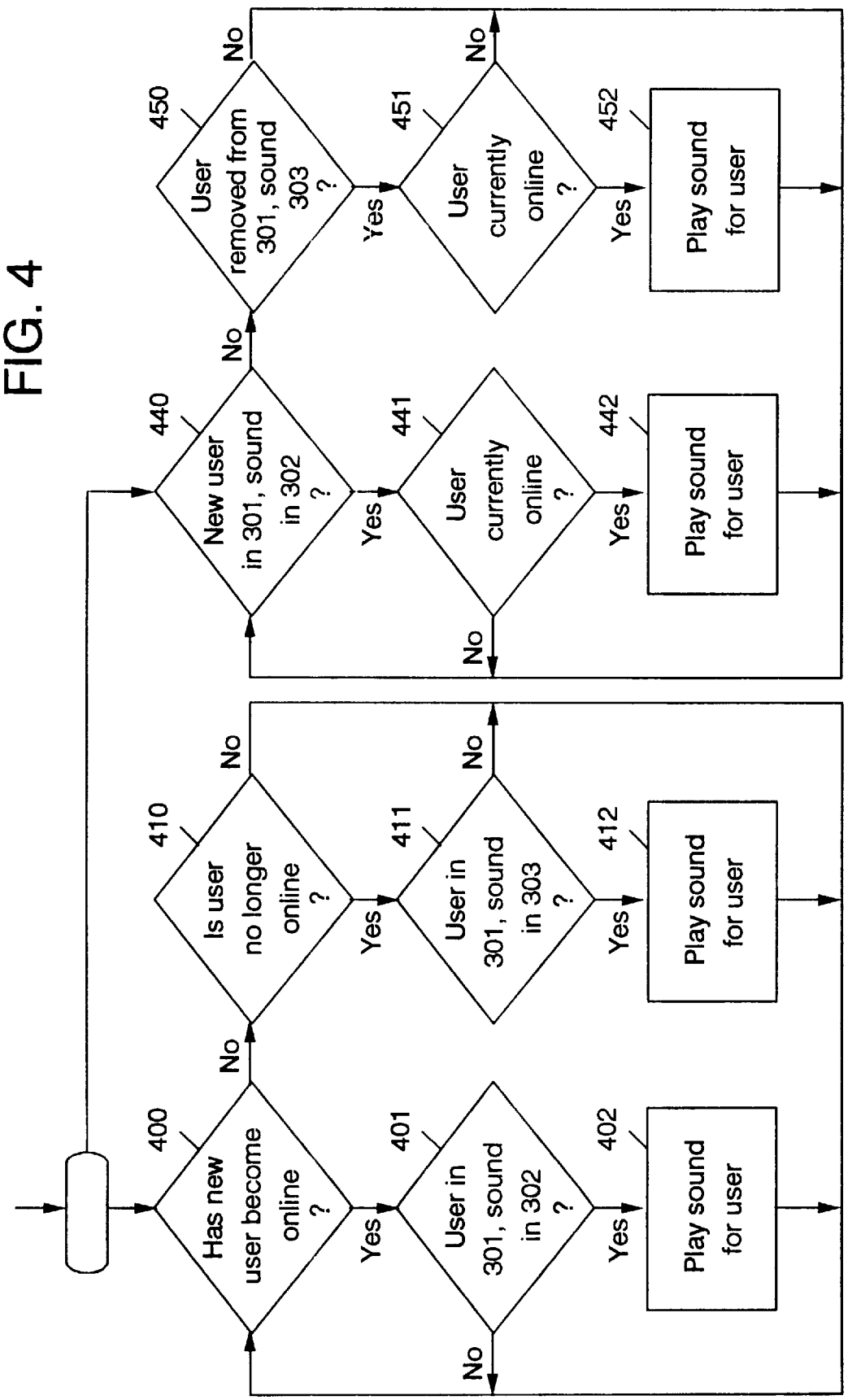
FIG. 4 is a high level flowchart for managing the Arrival/Departure channel.

Referring now to FIG. 4, a high level flowchart illustrates how signaling is performed on the Arrival/Departure channel 200 (FIG. 2). Control immediately divides into two concurrent processes beginning at decision blocks 400 and 440, respectively. The first process monitors for the arrival and departure of users in the online environment. It is determined at decision block 400 whether or not a new other user has entered the online environment. If the answer to decision block 400 is yes, then at decision block 401, it is determined whether or not the new other user is included in the Selected User List (component 301 of FIG. 3) and, if so, whether or not a designated audio signal (in component 302 of FIG. 3) has been assigned. If the answer to decision block 401 is yes, then at block 402, the designated audio is played, and control returns to decision block 400. If the answer to decision block 401 is no, control returns to decision block 400.

If the answer to decision block 400 is no, then at decision block 410, it is determined whether or not a previously online other user is no longer online. If the answer to decision block 410 is yes, it is determined at decision block 411 whether or not the other user is included in the Selected User List (component 301 of FIG. 3) and, if so, whether or not the other user has a designated audio signal for departure (in component 303 of FIG. 3). If the answer to decision block 411 is yes, the designated audio sound is played at block 412, and control returns to decision block 400. If the answer to decision blocks 410 or 411 is no, control also returns to decision block 400.

The second and simultaneous process is responsible for monitoring changes to the Selected User List and signaling changes in the visibility of users who are currently online in the network environment. The process begins at decision block 440 where it is determined whether or not a new other user is present in the Selected User List (component 301 of FIG. 3) and whether or not an audio signal (component 303 of FIG. 3) is designated. If the answer to decision block 440 is yes, then at decision block 441, it is determined whether or not this user is currently online. If the answer to decision block 441 is yes, the selected audio sound is played at block 442 and control returns to decision block 440. If the answer to decision block 441 is no, control returns to decision block 440.

If the answer to decision block 440 is no, it is determined at decision block 450 whether or not a user has been removed from the Selected User List (component 301 of FIG. 3). If the answer to decision block 450 is yes, then at decision block 451, it is determined whether or not this user is currently online. If the answer to decision block 451 is yes, then at block 452, the designated audio sound is played. Control then returns to decision block 440. If the answer to decision blocks 450 or 451 is no, control returns to decision block 440.

Figure 5:
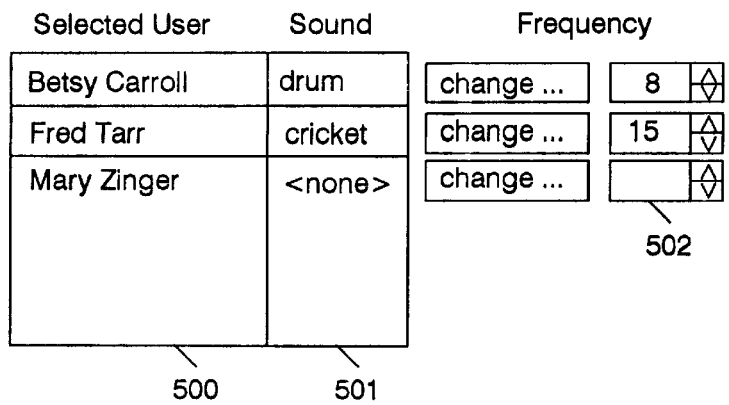
FIG. 5 illustrates a user interface that allows customization of a Priority Presence sub-channel of an online awareness system in accordance with the present invention.

Referring now to FIG. 5, a sample user interface for customizing the behavior of the Priority Presence sub-channel 202 (see FIG. 2) is illustrated. Component 500 provides a listing of all other users of interest as selected by the target user. This listing may be the same as the list provided by component 301 of FIG. 3. Alternative implementations may provide a user selection control similar to component 300 of FIG. 3. In component 501, the target user may designate a particular sound that should be played while each of the other users is online. In component 502, the target user designates how often each sound should be repeated. For example, while user Fred Tarr is online, a cricket sound should be played once every 15 seconds. However, while user Mary Zinger is online, no sound should be played. Although this user interface control has been described with respect to a particular graphical embodiment, many other interfaces can provide equivalent function and may be used by alternative embodiments of this invention.

The Priority Presence Subchannel generates audio signals periodically for the set of selected other users who are currently online. To do this, it maintains a queue of audio signals that need to be played (corresponding to the set of selected online other users). The signals are sorted by the queue so that the sound that must be played soonest is at the head of the queue and the sound that must be played latest is at the end of the queue.

Whenever the time arrives for the first sound on the queue to be played, the sound is played on the Subchannel. A new sound event is added to the queue corresponding to the next time that this sound (for the associated other user) should be played. The time associated with this new sound event is determined by the repetition of frequencies selected in FIG. 5.

The set of sound events in the queue corresponds to the set of other users who are currently present in the network environment and who are also selected in FIG. 5. For this reason, the system must monitor for the arrival/departure of other users in the network environment, and it must also monitor for changes in the Selected User List. This monitoring for other user arrival and departure is identical to that for the Arrival/Departure Channel. The arrival of a selected other user causes a new sound event to be added to the queue; the departure of a selected other user causes the corresponding sound event to be deleted from the queue.

Figure 6:
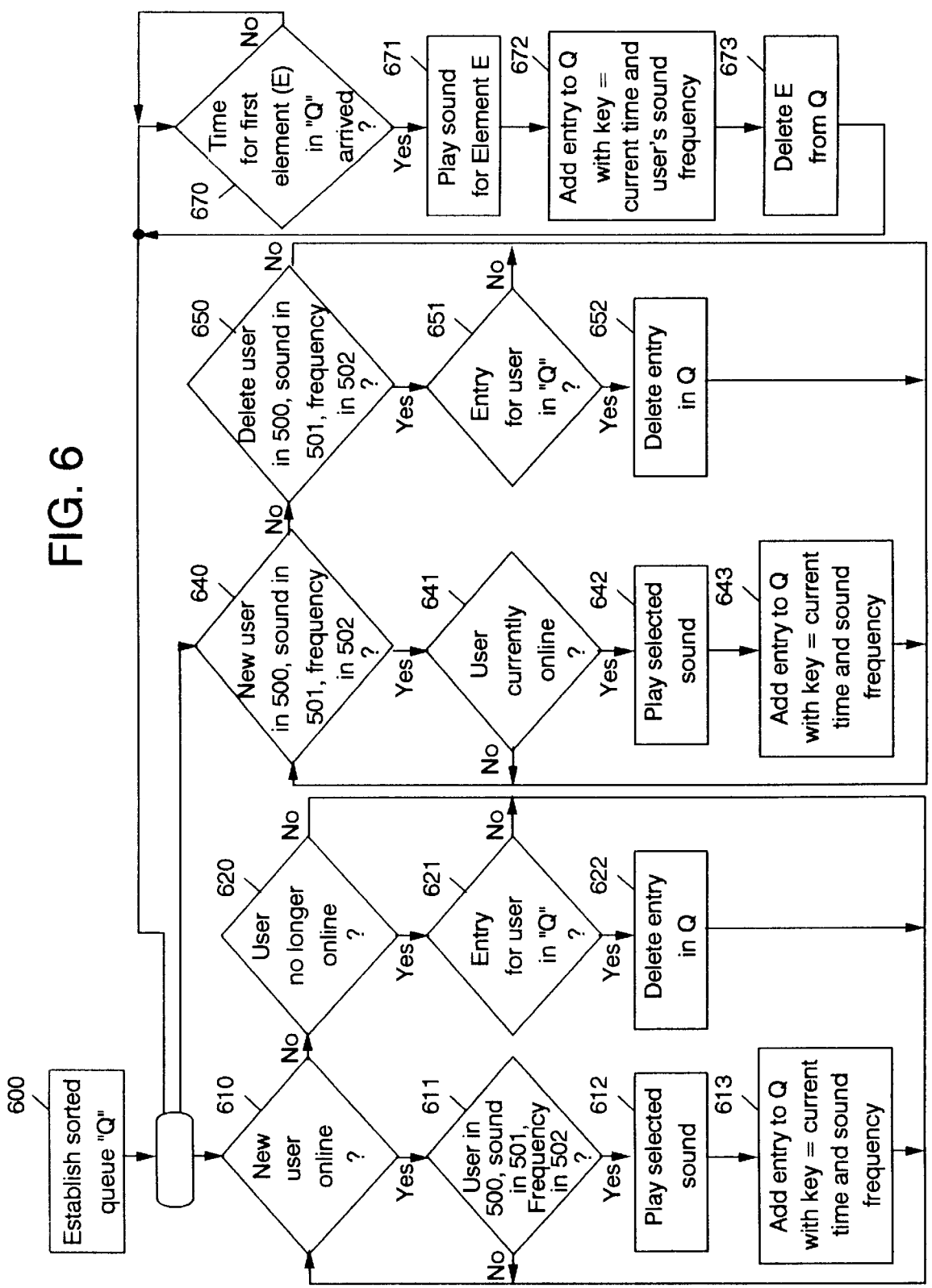
FIG. 6 is a high level flowchart for managing the Priority Presence sub-channel.

Referring now to FIG. 6, a high level flowchart describes how signaling is performed on the Priority Presence sub-channel 202 (see FIG. 2). At block 600 a sorted queue "Q" is established with no elements. Subsequently, the procedure divides into three parallel sub-processes, respectively, at blocks 610, 640, and 670.

The first process monitors for other users entering and leaving the network environment and adds and removes sound events for selected other users. The process begins at decision block 610 where it is determined whether or not a new other user has entered the online state. If the answer to decision block 610 is yes, then at decision block 611, it is determined whether or not the new other user is included in the Selected User List (component 500 of FIG. 5), whether or not the new other user is associated with a sound (component 501 of FIG. 5), and whether or not the new other user is associated with a repetition frequency (component 502 of FIG. 5). If the answer to decision block 611 is yes, then at block 612, the selected audio sound is played. At block 613, an entry is added to queue "Q" with a key equal to the current system clock time incremented by the repetition frequency associated with the new other user online. Subsequent to block 643 or if the answer to decision block 611 is no, control returns to decision block 610.

If the answer to decision block 610 is no, then at decision block 620, it is determined whether or not a previously online other user is no longer online. If the answer to decision block 620 is yes, then at decision block 621, it is determined whether or not an entry for this other user is currently in the queue "Q." If the answer to decision block 621 is yes, then at block 622, this entry is removed from queue "Q" and control returns to decision block 610. If the answer to decision block 620 is no or if the answer to decision block 621 is no, control returns to decision block 610.

The second process shown in FIG. 6 monitors for changes to the set of selected other users and adds and removes sound events if those other users are currently online. The process begins at decision block 640 where it is determined whether or not a new other user, sound, and repetition frequency have been added to components 500, 501 and 502 of FIG. 5. If the answer to decision block 640 is yes, then at decision block 641, it is determined whether or not this user is currently online. If the answer to decision block 641 is yes, then at block 642 the selected audio sound is played. At block 643, an entry is added to queue "Q" with a key equal to the current system clock time incremented by the repetition frequency associated with the newly added other user. Control then returns to decision block 640. If the answer to decision block 641 is no, control returns to decision block 640.

If the answer to decision block 640 is no, it is determined at decision block 650 whether or not an other user, sound, and repetition frequency have been removed from components 500, 501, and 502 of FIG. 5. If the answer to decision block 650 is yes, then at decision block 651, it is determined whether or not an entry for this user is currently in the queue "Q." If the answer to decision block 651 is yes, this entry is removed from queue "Q" at block 652 and control returns to decision block 640. If the answer to decision blocks 650 or 651 is no, control returns to decision block 640.

The third process shown in FIG. 6 plays the sound events in the queue and schedules future sound events according to the associated repetition frequencies. The process begins at decision block 670, where it is determined whether or not the key (time) associated with a first sorted element (element "E") in the queue "Q" has arrived. If the answer to decision block 670 is no, then control returns to decision block 670. If the answer to decision block 670 is yes, then at block 671, the sound associated with the user associated with element "E" is played. At block 672, an entry is added to queue "Q" with a key equal to the current system clock time incremented by the repetition frequency associated with the other user. At block 673, the element "E" is removed from queue "Q," and control returns to decision block 670.

Figure 7:
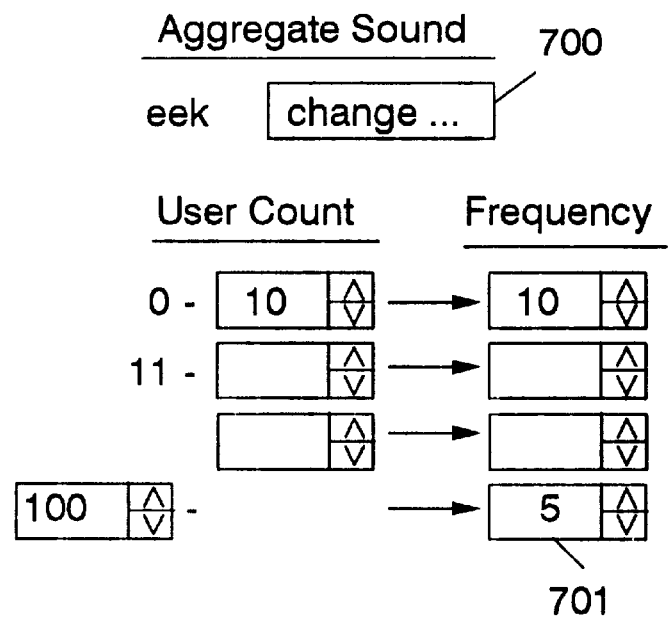
FIG. 7 illustrates a user interface that allows customization of an Aggregate Presence sub-channel of an online awareness system in accordance with the present invention.

Referring now to FIG. 7, a sample user interface for customizing the behavior of the Aggregate Presence sub-channel 203 of FIG. 2 is shown. Component 700 allows the user to select a particular sound that should be played to represent an aggregate number of other users currently online. Component 701 allows the target user to designate repetition frequencies corresponding to the aggregate number of other users who are currently online. For example, the "eek" sound would be played once every ten seconds if there are fewer than 10 users online, and it would be played once every 5 seconds if there are more than 100 users online. The repetition frequency scales between 10 seconds and 5 seconds as the number of online users grows from 10 to 100. Although this user interface control has been described with respect to a particular graphical embodiment, many other interfaces can provide equivalent function and may be used by alternative embodiments of this invention.

Figure 8:
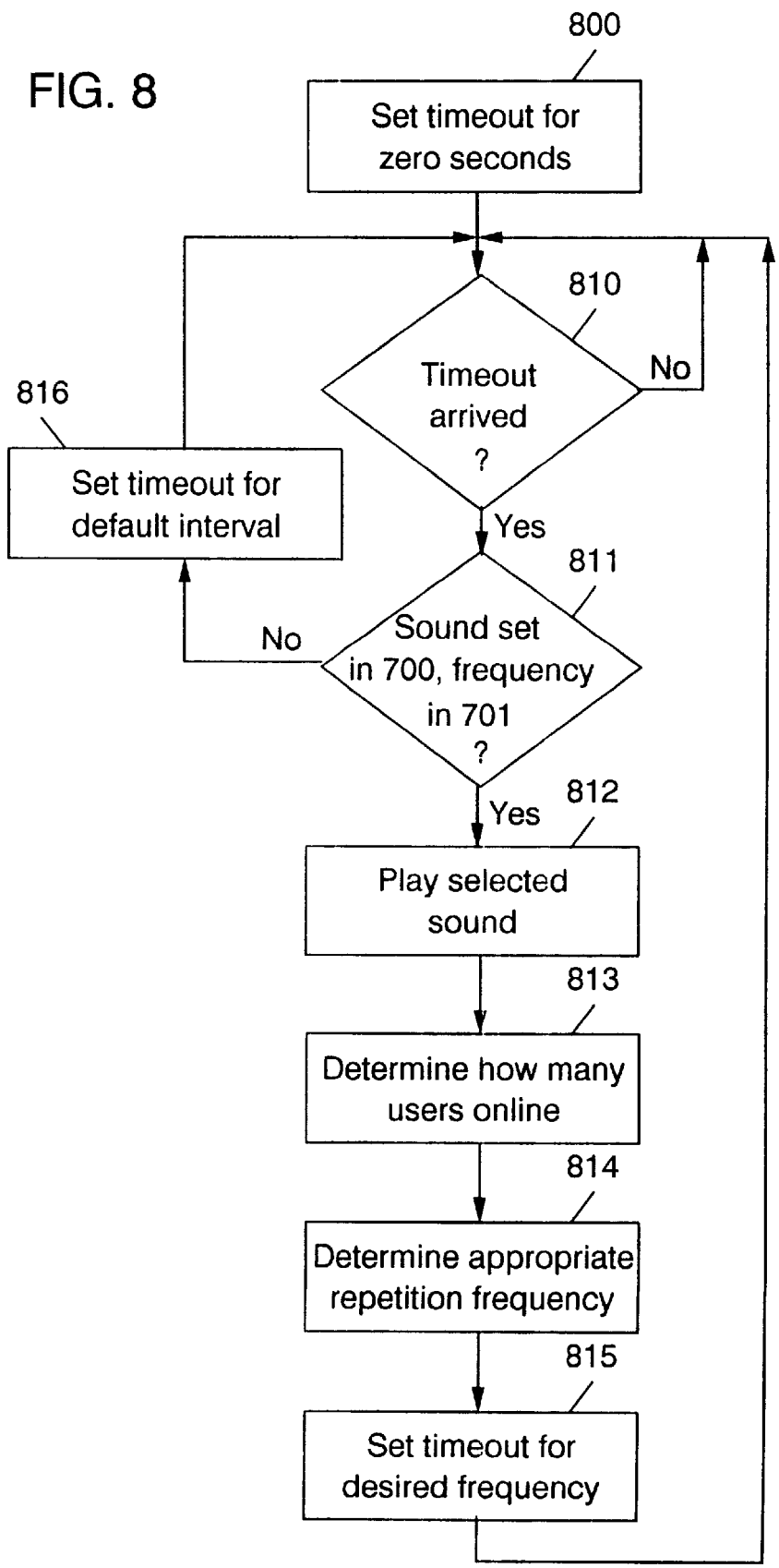
FIG. 8 is a high level flowchart illustrating how signaling is performed on the Aggregate Presence sub-channel.

Referring now to FIG. 8, a high level flowchart illustrates how signaling is performed on the Aggregate Presence sub-channel 203 of FIG. 2. At block 800, a timeout is set for zero seconds into the future. At decision block 810, it is determined whether or not a timeout has arrived. If the answer to decision block 810 is no, then control returns to decision block 810. If the answer to decision block 810 is yes, it is determined at decision block 811 whether or not a sound and a sound frequency have been specified in components 700 and 701 of FIG. 7. If the answer to decision block 811 is yes, then at block 812, the selected sound (from component 700 of FIG. 7) is played. At block 813, it is determined how many users are currently online. At block 814, the appropriate repetition frequency is determined based on the number of users currently online (as computed in block 813) and the specifications of component 701 of FIG. 7. At block 815, a timeout is set for the repetition frequency determined in block 814. Control then returns to decision block 810. If the answer to decision block 811 is no, then a timeout is set for some default interval at block 816 and control returns to block 810.

Although not shown in FIGS. 7 and 8, it is understood that the Aggregate Presence sub-channel 203 may be represented by other audio cues. For instance, instead of varying the repetition frequency based on the number of online users, the user interface may allow target users to specify different sounds to be played (at a fixed repetition frequency) depending on the number of other users online.

Figure 9:
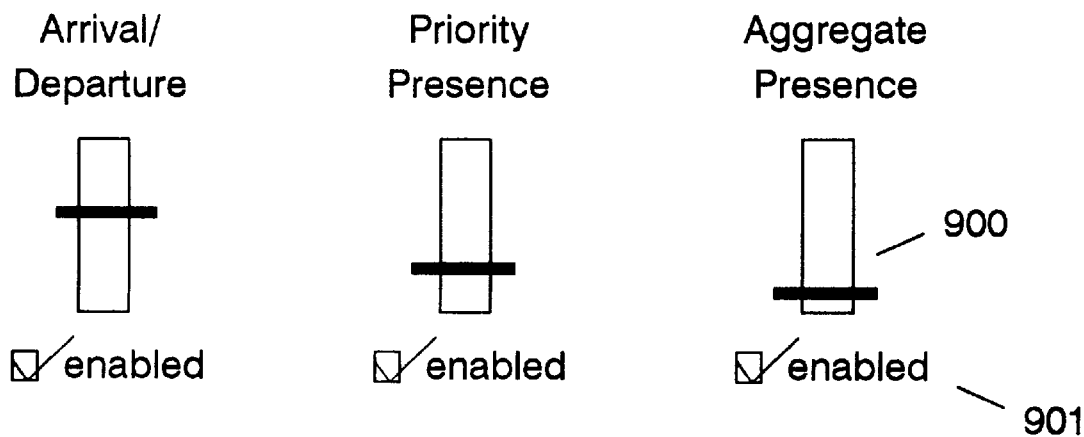
FIG. 9 illustrates a sample user interface for controlling various presence channels of an online awareness system in accordance with the present invention.

Referring now to FIG. 9, a sample user interface for controlling the various presence channels is illustrated. Component 900 allows the user to adjust the volume balance across the different channels. Component 901 allows the user to enable or disable each of the channels. Although this user interface control has been described with respect to a particular graphical embodiment, many other interfaces can provide equivalent function and may be used by alternative embodiments of this invention.

It is an advantage of the present invention that the target user receives continuous information about the arrival and departure of selected other users, the presence of a selected set of other users, and the aggregate number of other users currently online.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. A method of providing a target user with online awareness of other users in a networked environment, comprising the steps of:

generating an online notification when a new other user enters the networked environment;

generating audio signals to serve as on-going priority notifications that identify which particular ones of said other users are currently online; and generating an off-line notification when any of said other users is no longer online in the networked environment.

2. The method of claim 1, wherein said step of generating an online notification comprises generating an audio signal.

3. The method of claim 2, wherein said audio signal identifies which of said other users has entered the networked environment.

4. The method of claim 1, further comprising the step of said target user selecting which of said other users will cause said online notifications.

5. The method of claim 1, wherein said step of generating an off-line notification comprises generating an audio signal.

6. The method of claim 5, wherein said audio signal identifies which of said other users has departed the networked environment.

7. The method of claim 1, further comprising said target user selecting which of said other users will cause said off-line notifications.

8. The method of claim 1, wherein said step of generating on-going notifications further comprises generating on-going aggregate notifications about how many said other users are currently online.

9. The method of claim 8, wherein said on-going aggregate notifications comprise audio signals.

10. The method of claim 9, further comprising the step of said target user customizing a number and frequency of said audio signals for said aggregate notifications.

11. The method of claim 1, further comprising the step of said target user controlling a volume balance among said online notification, said off-line notification, and said on-going notifications.

12. A system for providing a target user with online awareness of other users in a networked environment, comprising:

means for generating an online notification when a new other user enters the networked environment;

means for generating audio signals to serve as on-going priority notifications that identify which particular ones of said other users are currently online; and means for generating an off-line notification when any of said other users is no longer online in the networked environment.

13. The system of claim 12, wherein said means for generating an online notification comprises means for generating an audio signal.

14. The system of claim 13, wherein said audio signal identifies which of said other users has entered the networked environment.

15. The system of claim 12, further comprising means for said target user selecting which of said other users will cause said online notifications.

16. The system of claim 12, wherein said means for generating an off-line notification comprises means for generating an audio signal.

17. The system of claim 16, wherein said audio signal identifies which of said other users has departed the networked environment.

18. The system of claim 12, further comprising means for said target user selecting which of said other users should cause said off-line notifications.

19. The system of claim 16, wherein said means for generating on-going notifications further comprises means for generating on-going aggregate notifications about how many said other users are currently online.

20. The system of claim 19, wherein said on-going aggregate notifications comprise audio signals.

21. The system of claim 20, further comprising means for said target user customizing a number and frequency of said audio signals for said aggregate notifications.

22. The system of claim 12, further comprising means for said target user controlling a volume balance among said online notifications, said off-line notifications, and said on-going notifications.

23. A computer program product recorded on computer readable medium for providing a target user with online awareness of other users in a networked environment, comprising:

computer readable means for generating an online notification when a new other user enters the networked environment;

computer readable means for generating audio signals to serve as on-going priority notifications that identify which particular ones of said other users are currently online; and computer readable means for generating an off-line notification when any of said other users is no longer online in the networked environment.

24. The program product of claim 23, wherein said computer readable means for generating an online notification comprises computer readable means for generating an audio signal.

25. The program product of claim 24, wherein said audio signal identifies which of said other users has entered the networked environment.

26. The program product of claim 23, further comprising computer readable means for said target user selecting which of said other users should cause said online notifications.

27. The program product of claim 23, wherein said computer readable means for generating an off-line notification comprises computer readable means for generating an audio signal.

28. The program product of claim 27, wherein said audio signal identifies which of said other users has departed the networked environment.

29. The program product of claim 23, further comprising computer readable means for said target user selecting which of said other users will cause said off-line notifications.

30. The program product of claim 23, wherein said computer readable means for generating on-going notifications further comprises computer readable means for generating on-going aggregate notifications about how many said other users are currently online.

31. The program product of claim 30, wherein said on-going aggregate notifications comprise audio signals.

32. The program product of claim 31, further comprising computer readable means for said target user customizing a number and frequency of said audio signals for said aggregate notifications.

33. The program product of claim 23, further comprising computer readable means for said target user controlling a volume balance among said online notifications, said off-line notifications, and said on-going notifications.

* * * * *